(12) United States Patent
Liikanen et al.

(10) Patent No.: US 6,678,102 B1
(45) Date of Patent: Jan. 13, 2004

(54) HIGH FLY WRITE DETECTION METHOD

(75) Inventors: Bruce Liikanen, Berthoud, CO (US); Julian Lewkowicz, Lafayette, CO (US); Larry Koudele, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 291 days.

(21) Appl. No.: 09/649,660

(22) Filed: Aug. 29, 2000

(51) Int. Cl.⁷ ............................................. G11B 27/36
(52) U.S. Cl. ........................ 360/31; 360/60; 360/75; 360/53; 360/46; 360/77.08
(58) Field of Search .................. 360/60, 31, 75, 360/53, 46, 67, 77.08, 68; 324/210, 212, 226

(56) References Cited

U.S. PATENT DOCUMENTS

| | | | |
|---|---|---|---|
| 4,777,544 A | 10/1988 | Brown et al. | |
| 4,933,783 A | 6/1990 | Yasui | |
| 5,082,827 A | 1/1992 | Barnes | |
| 5,130,866 A | 7/1992 | Klaassen et al. | |
| 5,168,413 A | 12/1992 | Coker et al. | |
| 5,339,207 A | 8/1994 | Moon et al. | |
| 5,377,058 A | 12/1994 | Good et al. | |
| 5,410,439 A | 4/1995 | Egbert et al. | |
| 5,412,519 A | 5/1995 | Buettner et al. | |
| 5,446,601 A | 8/1995 | Fukuta | |
| 5,631,891 A | 5/1997 | Moritsugu et al. | |
| 5,760,983 A | 6/1998 | Cowen | |
| 5,831,781 A | * 11/1998 | Okamura | 360/31 |
| 5,909,330 A | 6/1999 | Carlson et al. | |
| 6,249,393 B1 | * 6/2001 | Billings et al. | 360/31 |

* cited by examiner

Primary Examiner—Alan T Faber
(74) Attorney, Agent, or Firm—Tejpal S. Hansra (57) ABSTRACT

A method and apparatus for detecting a high fly write event in a computer disk drive is provided. The method and apparatus allow the detection of high fly write events occurring over very short time spans. In addition, the present invention provides a method and apparatus for detecting high fly write events with a great deal of sensitivity. The method and apparatus of the present invention provide quick response and high sensitivity by monitoring the strength of a signal derived from a servo sector position burst or a group of bursts, and signaling a high fly write event if the monitored signal strength is less than a predetermined or threshold amount.

31 Claims, 3 Drawing Sheets

HIGH FLY WRITE DETECTION METHOD

FIELD OF THE INVENTION

The present invention relates to the flying height of disk drive transducer heads over the surface of magnetic storage disks. In particular, the present invention relates to the detection of transient high fly write conditions in a computer disk drive.

BACKGROUND OF THE INVENTION

Computer disk drives store information on magnetic disks. Typically, the information is stored on each disk in concentric tracks, divided into sectors. Information is written to and read from a disk by a transducer head, mounted on an actuator arm capable of moving the transducer head radially over the disk. Accordingly, the movement of the actuator arm allows the transducer head to access different tracks. The disk is rotated by a spindle motor at a high speed, allowing the transducer head to access different sectors on the disk. The transducer head may include separate or integrated read and write heads.

In a typical computer disk drive, the transducer head generally rides above the surface of the disk on a cushion of air that is created by the movement of the disk under the head. The distance of the head from the surface of the magnetic disk is known as the flying height of the transducer head. It is important to maintain the flying height of the transducer head within a desired range. For example, if the transducer head flies at too low a height, it is more likely to come into contact with the magnetic disk causing a loss of stored data. It is also important to ensure that the transducer head does not fly at too great a height. Where the transducer head is consistently at too great a distance from the magnetic disk, the transducer head is said to be in a "high flying" condition. A "high fly write event" occurs when the transducer head suddenly is at too great a height from the disk to reliably perform write operations.

Data written to a magnetic storage disk for storage while a transducer head is experiencing a high fly write condition may be lost. This is because the strength of the magnetic field generated by the write head decreases exponentially with distance. Accordingly, where the transducer is at too great a distance from the surface of the magnetic disk (e.g., during a high fly write event), the magnetic field produced may not be strong enough to induce the desired magnetic transitions in the storage disk. Therefore, it is important to detect a high fly write event in a computer disk drive, so that writing to the disk may be delayed until the transducer head has returned to the desired flying height above the surface of the disk.

Previous methods of detecting high fly write events have included monitoring the amplitude of a signal produced in the read head when the read head passes over an automatic gain control (AGC) field on the disk. In general, automatic gain control fields are written to computer disk drive storage disks during manufacturing. AGC fields are usually located in "servo sectors" or "hard sectors," which are areas extending radially across the disk that contain servo positioning information. In general, the automatic gain control fields provide a reference magnetic field strength, so that the gain added to read signals by the hard disk drive's channel can be appropriately adjusted.

During the manufacture of a hard disk drive, servo sector information is written to the disk. During this "track writing" procedure, transducer heads having a write head that is about ⅔ the width of a data track are used. Because the AGC fields are the width of an entire data track, each AGC field must be written by at least three passes of the write head. This "stitching" together of the AGC fields causes the AGC fields to be vulnerable to manufacturing defects that result in AGC fields with unevenly spaced magnetic transitions, that in turn result in magnetic fields of uneven strength. These manufacturing defects result in the production of signals in the read head that vary in amplitude. Although these manufacturing defects do not affect the functioning of the AGC fields in connection with their primary gain control function, it prevents high fly event detection systems dependent upon the amplitude of the AGC field from operating with high sensitivity. In addition to defects within individual AGC fields, defects resulting in undesired variations in the magnetic strength of the AGC fields may arise between adjoining AGC fields, where the fields are aligned radially across all or a portion of the disk.

Sensitivity is important in detecting high fly write events, because such events are transient in nature. For example, a high fly write event may occur when a transducer head passes over a particle on the surface of the disk. The particle may cause a perturbation in the boundary layer of air supporting the transducer head, causing the head to fly at greater than a desired distance from the disk surface. In a typical high fly event, the transducer head flies at too great a height for one or two sectors of the disk. Therefore, it can be appreciated that detection of a high fly write event preferably is made on the basis of information collected over a single sector of the disk. Furthermore, because the change in height is small, and because the high fly write event may last for extremely short periods of time, it is important that the high fly write detection mechanism be extremely sensitive, so that high fly write events can be detected even at the beginning or end of such an event.

Another method of detecting a high fly write event is disclosed by U.S. Pat. No. 5,909,330 to Carlson et al., assigned to the assignee of the present invention. According to Carlson, whether the flying height of a read/write head above a disk is within an acceptable range can be determined by the resolution of a signal read by the read head. This method is different from the present invention in that it relies upon the decrease in the number of detected signal peaks as the flying height of the read head increases.

For the above stated reasons, it would be advantageous to provide a method and apparatus for quickly and reliably sensing a high fly write event in a computer disk drive. In addition, it would be advantageous to provide a method and apparatus for detecting high fly write events that did not adversely affect the performance of the disk drive. Furthermore, it would be advantageous to provide such a method and apparatus that can be implemented at an acceptable cost and that is reliable in operation.

SUMMARY OF THE INVENTION

In accordance with the present invention, a method and apparatus for detecting the flying height of a disk drive transducer head over the surface of a magnetic storage disk is provided. According to the present invention, the strength or amplitude of a signal derived from servo sector position bursts written to the magnetic disk is monitored to determine the height of the transducer head over the magnetic disk. The present invention allows high fly events to be detected, even where the transducer head is in a high fly condition for only a very brief period of time.

According to an embodiment of the present invention, the average amplitude of a signal derived from a servo sector position burst or group of servo sector position bursts is determined. The amplitude of signals derived from the passage of a servo sector position burst or group of bursts is then compared to the average value. If the observed amplitude is less than the average amplitude, a write fault error may be triggered. Typically, a write fault error prevents attempts at writing information to the magnetic disk for a period of time. According to one embodiment of the present invention, the transducer head is prohibited from performing write operations for a time that is equivalent to the approximate amount of time required for at least two servo sectors on the magnetic disk to pass beneath the transducer head.

According to another embodiment of the present invention, the amplitude of a signal derived from a servo sector position burst or a group of bursts is compared to a value or values derived from, but not exactly equal to, a calculated average amplitude. For instance, a high fly write event may be triggered only if the observed amplitude of a signal derived from a servo sector position burst or a group of bursts is less than an average signal amplitude by at least a predetermined amount.

According to yet another embodiment of the present invention, the observed amplitude of a signal derived from a servo sector position burst or a group of bursts may be compared to a range of values derived from an average signal amplitude. According to this embodiment, the present invention may be utilized to detect both high fly events and occurrences when the transducer head flies at too low a height.

According to a further embodiment of the present invention, the observed strength or amplitude of a signal derived from a servo sector position burst or a group of bursts may be compared to a calibrated value. The calibrated value may be obtained during calibration procedures performed during the manufacture or closely following the manufacture of the disk drive. Such a calibrated value may be substituted for the average value described in connection with any of the embodiments of the present invention described herein.

As yet a further embodiment of the present invention, an average or calibrated threshold value may be determined according to the zones present on the magnetic disk. Accordingly, the amplitude of an observed signal derived from a servo sector position burst or a group of bursts located in a particular zone may be compared to an average or calibrated threshold amplitude for that particular zone.

Based on the foregoing summary, a number of salient features of the present invention are readily discerned. A computer disk drive having the capability of detecting high fly write events, and thereby helping to ensure the integrity of data written to a disk, is provided. In particular, a method and apparatus for detecting high fly write events with great sensitivity is provided.

Additional advantages of the present invention will become readily apparent from the following discussion, particularly when taken together with the accompanying drawings.

DETAILED DESCRIPTION

Figure 1:
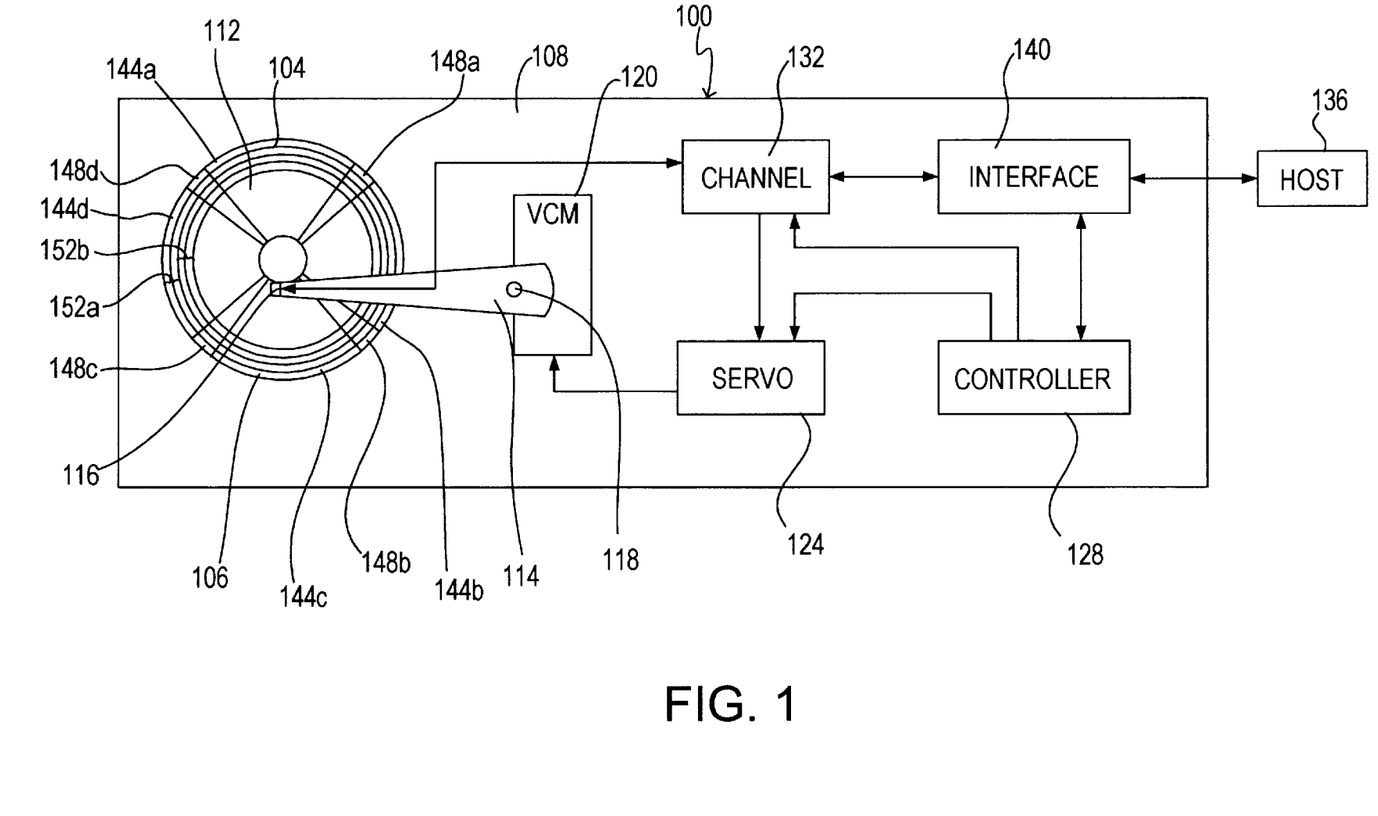
FIG. 1 is a block diagram illustrating a disk drive system that can utilize features of the present invention.

With reference now to FIG. 1, the major components of a hard disk drive, generally identified as hard disk drive 100, are illustrated. As shown in FIG. 1, a hard disk drive generally includes a magnetic storage disk 104 rotatably mounted to a base 108 by a spindle bearing 112. Within the spindle bearing 112 is a spindle motor (not shown) for rotating the disk 104 relative to the base 108. An actuator arm 114 has at a first end a transducer head 116. The actuator arm 114 is pivotally interconnected to the base 108 by an actuator arm bearing 118. At a second end, the actuator arm 114 is interconnected to a voice coil motor 120 capable of pivoting the actuator arm 114 about the bearing 118.

The operation of the voice coil motor 120 is controlled by a servo 124, which provides appropriate control signals to the voice coil motor 120. In general, the voice coil motor 120 positions the transducer head 116 over a desired track 106 on the storage disk 104.

A controller 128 provides information to the servo 124 regarding the desired or target track 106. The controller 128 additionally provides timing information to the channel 132. The channel 132 is operative for processing data flowing between a host computer 136 and the disk 104. The interface 140 is operative for managing the flow of data between the host unit 136 and the disk drive 100, and receives commands from the host 136 for delivery to the controller 128.

The tracks 106 are divided into a plurality of data sectors 144a–d by a plurality of servo sectors 148a–d. A plurality of zones 152a–b may be formed from groupings of tracks 106. As shown in FIG. 1, the servo sectors 148 may extend radially across the disk 104 in continuous lines. However, it should be appreciated that the servo sectors may be more numerous toward the outer circumference of the disk 104, and less numerous toward the inner circumference of the disk, for instance, where zone density recording techniques are used to increase the storage capacity of the disk 104.

As an example of the operation of the disk drive 100, in response to a digital signal from the host computer 136 to write data to the disk 104, the channel 132 processes the signal from the host computer 136 and converts it to a variable write current signal that is delivered to the transducer head 116. The actuator arm 114 carries the transducer head 116 and positions the head 116 above the target track 106. In particular, the voice coil motor 120 moves the actuator arm 114 to position the transducer head 116 above the target track 106. The voice coil motor 120 is responsive to a servo control signal from the servo control unit 124.

During a read operation, the controller 128 receives via the interface 140 a request from the host 136 for a particular piece of information stored on the disk 104. The controller 128 issues a control signal to the servo 124, which in turn actuates the voice coil motor 120 to position the transducer head 116 over the target track 106. After the transducer head 116 is in position, data from the track 106 is read by the transducer head 116, and the resulting signal passed to the channel 132. Channel 132 receives the analog read signal provided by the transducer head 116, and converts that signal into a digital signal that can be understood by the host 136.

Figure 2:
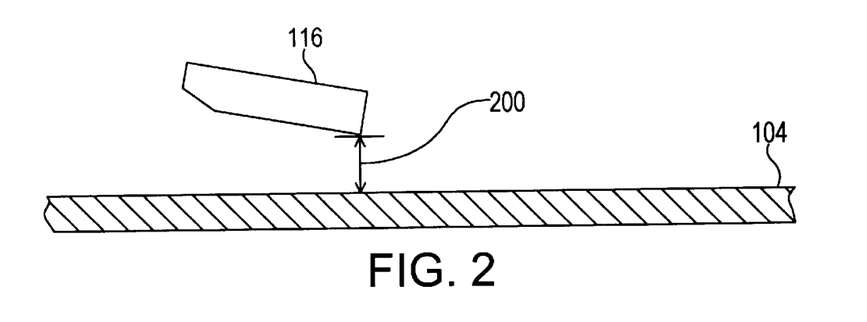
FIG. 2 is a representation of a sectional view of a disk and an associated head illustrating the flying height of the head above the disk surface.

With reference now to FIG. 2, a representation of a sectional view of a storage disk 104 and transducer head 116 is illustrated. As shown in FIG. 2, during operation, the head 116 (which, as illustrated, includes a slider) is raised above the surface of the disk 104 by a spacing 200 known as the flying height of the head 116. The spacing 200 is created by the interaction between air currents above the surface of the disk 104 caused by the rotation of the disk 104 and the aerodynamic qualities of the slider of the transducer head 116.

Figure 3:
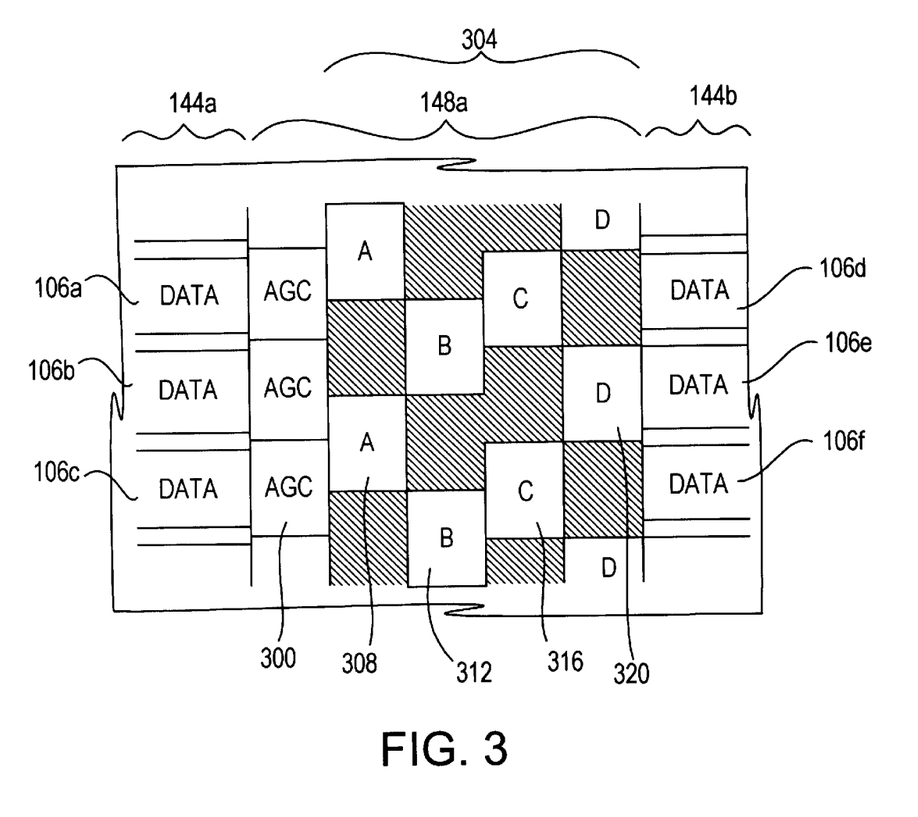
FIG. 3 is a schematic illustration of an arrangement of information on a magnetic storage disk according to one embodiment of the present invention.

With reference now to FIG. 3, the informational content of a portion of a disk 104 surface in a typical disk drive 100 is illustrated. As illustrated in FIG. 3, the disk 104 includes data sectors 144a and 144b separated by a servo sector 148a containing positioning information. In a typical disk drive, a plurality of servo sectors 148 extend radially across the surface of the disk 104 to divide it into a plurality of data regions. The data sectors 144a and 144b are, for illustration purposes, shown with three tracks 106a, 106b and 106c in the first data sector 144a, and three data tracks 106d, 106e and 106f in the second data sector 144b. However, it will be appreciated that, in a typical disk drive, there may be thousands of data tracks 106 concentrically arrayed across the disk 104, each divided into well over one-hundred sectors.

With continued reference to FIG. 3, the servo sector 148a is shown to include a plurality of automatic gain control (AGC) fields 300. The AGC fields 300 extend across the disk 104 radially, from an inside diameter to an outside diameter of the disk 104. In FIG. 3, the AGC fields 300 are shown to extend across the disk 104 in continuous lines, although this need not be the case. Generally, each AGC field 300 contains a signal of a calibrated strength. As the transducer head 116 passes over the AGC field 300, the strength of the signal passed through the channel 132 is monitored. This signal strength is used to adjust the gain imparted to signals read by the transducer head 116. Generally, at least after an initial adjustment to the gain of the channel 132 has been made, adjustments to the amount of gain are made gradually. In part, this is because the amplitude of a single AGC field 300 cannot be precisely controlled. In particular, because the AGC fields 300 extend radially across the disk, they must be written in a piecemeal fashion, and "stitched" together. At the intersection between separately written portions of the AGC field 300, variations in the strength of the magnetic transitions written to the disk 104 are common. These variations result in the production of signals in the channel 132 of varying amplitudes. In addition, allowing rapid changes to the amount of gain in the channel 132 would interfere with the accurate detection of high fly events according to the present invention. Therefore, it is preferable to prevent rapid changes to the gain imparted to read signals by the channel 132 after an initial amount of gain has been set.

Also illustrated in FIG. 3, is a servo sector position information region 304, having servo sector position bursts A 308, B 312, C 316 and D 320. In a typical disk drive 100, the servo sector position bursts 308–320 are used to enable the transducer head 116 to be precisely positioned over the center of a target data track 106. The servo sector position bursts 308–320 may, in addition to the configuration illustrated in FIG. 3, be arranged in alternative patterns. In addition, a lesser or greater number of servo sector position bursts 308–320 may be provided. For example, only A 308 and B 312 servo sector position bursts may be provided.

The inventors of the present application have found that the sum of the amplitudes of the servo sector position bursts 308–320 in a servo sector position information region 304 of a disk 104 provides a relatively constant value from track to track and sector to sector. Therefore, the amplitude of the sum of the servo sector position bursts 308–320 can be used to provide accurate fly height information to the controller 128 of the disk drive 100.

Figure 4:
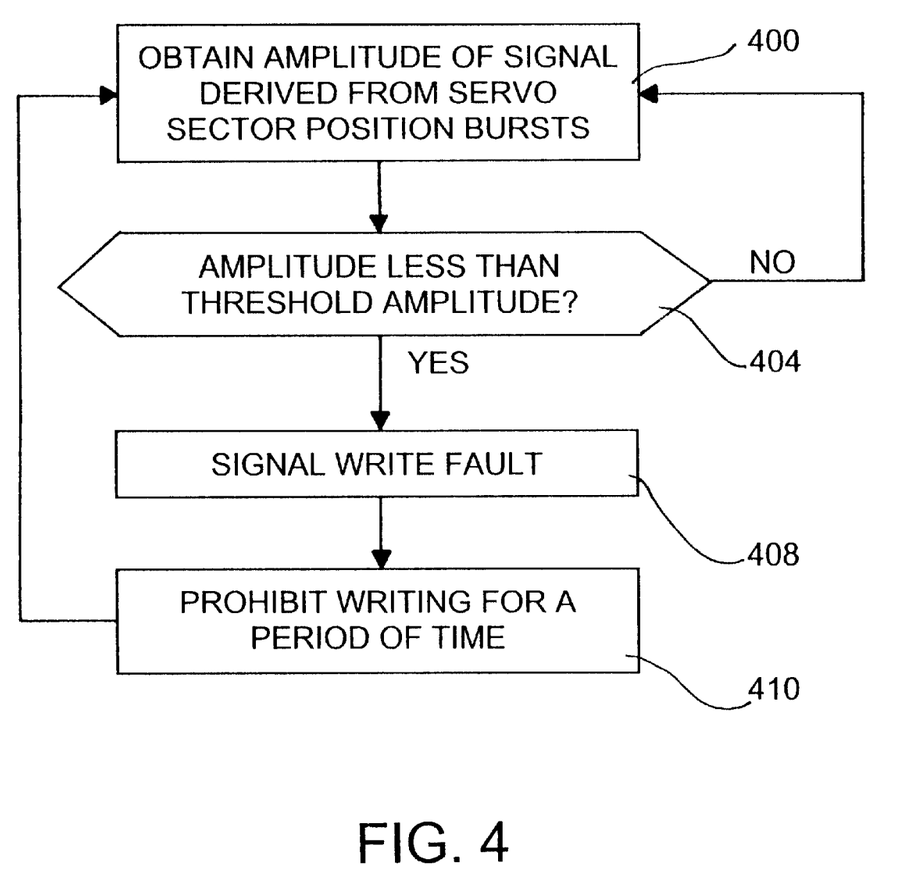
FIG. 4 is a flow chart showing the operation of a system according to an embodiment of the present invention.

With reference now to FIG. 4, a flow chart of the operation of the present invention is shown. Initially, at step 400, an amplitude or strength of a signal derived from the servo sector position bursts 308–320 is determined. For purposes of the present invention, the particular servo sector position bursts 308–320 from which a signal is derived is unimportant, as it is the amplitude of the sum of the signals derived from the servo sector position bursts 308–320 that is important to the present invention, and not information concerning the position of the transducer head across the plane of the disk 104. At step 404, the amplitude of the sum of the servo sector position bursts 308–320 is compared to a threshold or reference amplitude. If the amplitude of the signal derived from the servo sector position bursts 308–320 is equal to or greater than the threshold amplitude, the transducer head 116 is not considered to be experiencing a high fly event, and write operations may be allowed to proceed normally. In this case, the system returns to step 400, and obtains the amplitude of each successive group of servo sector position bursts 308–320 traversed by the transducer head 116, and compares the amplitude of the resulting signal to the threshold amplitude. Accordingly, it can appreciated that the system preferably runs continuously while the disk drive 100 is in operation. Alternatively, the operation of the high fly write detection system may be discontinued when a write operation is not imminent.

If it is determined at step 404 that the sum of the amplitudes of a group of servo sector position bursts 308–320 is less than the threshold amplitude, a write fault event is indicated at step 408. In response to the signaling of a write fault event, write operations are prohibited for a period of time (step 410). For example, according to one embodiment of the present invention, write operations may be prohibited for a period of time corresponding to the passage of at least two servo sectors 148 beneath the transducer head 116. According to another embodiment of the present invention, write operations may be prohibited for a period of time corresponding to the time necessary for a single servo sector 148 to pass beneath the transducer head 116. After the specified period of delay has elapsed, write operations may again be enabled, and operation of the system continued. Alternatively, write operations may be enabled as soon as the sum of the amplitudes of a group of servo sector position bursts 308–320 is greater than or equal to the threshold amplitude.

According to the present invention, the threshold amplitude against which the amplitude of the sum of servo sector position bursts 308–320 is compared may be determined from an average value for an amplitude of a signal derived from a sum of servo sector position bursts 308–320. This average value may be calculated as an initially or periodically determined average, or as a running average.

For example, according to one embodiment of the present invention, the threshold signal strength or amplitude value is determined by adding the amplitudes of signals derived from N groups of servo sector position bursts 308–320 to obtain a sum. The value thus obtained may be divided by N to obtain an average value.

According to another embodiment of the present invention, the threshold value may be a running average. According to this embodiment, the amplitude of a sum of signals derived from the previous N servo sector position bursts 308–320 is divided by N to obtain an average value.

As yet a further embodiment of the present invention, an initial average of a signal amplitude may be computed using the sum of N samples divided by N. After this initial average is obtained, a next position sample is taken, and the difference between the average amplitude and the amplitude of the next position sample is calculated. The result is divided by N and added to the average amplitude to obtain a new average amplitude. In this way, a running average may be maintained.

The particular method employed for determining an average value is not important. Accordingly, any method for determining an average value may be used in accordance with the present invention.

The threshold amplitude may, in addition to being an average sum of amplitudes derived from a number of servo sector positioning bursts 308–320, be a value representing a manipulated average. For example, an average amplitude may be applied to a first algorithm to obtain a first acceptable range limit, and the average value may be applied to a second algorithm to obtain a second acceptable range limit. This allows the present invention to determine whether the transducer head 116 is within an acceptable height range above the disk 104, and not simply whether or not a high fly write event has occurred. In addition, an average value may be applied to an algorithm to arrive at a threshold amplitude that is weighted in a particular direction. For instance, a value may be added to or subtracted from the average value to obtain a modified average value that is set as the threshold value. Similarly, the average value may be multiplied by a correction factor to obtain a threshold value. In addition to mathematical manipulations of the average to obtain a threshold value, the threshold value may be determined by indexing average values or ranges of average values to tabulated threshold values. Accordingly, variations in the fly height may be accommodated within a predetermined maximum acceptable fly height.

According to a further embodiment of the present invention, the observed strength or amplitude of the signal derived from servo sector position bursts 308–320 may be compared to a calibrated or predetermined value. For instance, a desired minimum amplitude at a maximum fly height may be determined, and this calibrated value may be compared to the amplitude of signals derived from servo sector position bursts passing beneath the transducer head 116 to detect the occurrence of a high fly event. According to one embodiment of the present invention, the calibrated value is determined as the part of the manufacture of the disk drive. According to another embodiment of the present invention, the calibrated value is determined using one or a number of disk drives, and the average value obtained set as the threshold value against which observed amplitudes are compared in subsequently manufactured or calibrated disk drives.

As with observed average values, threshold values obtained through a calibration process may be derived from the calibrated value. For instance, a correction factor may be applied to a signal amplitude value obtained by calibration and the resulting value set as the threshold value against which observed signals are compared.

According to yet another embodiment of the present invention, threshold values may be set for servo sector position bursts 308–320 associated with particular tracks 106, for servo sector position bursts 308–320 located within particular zones, for servo sector position bursts 308–320 associated with particular tracks and located within particular servo sectors, for individual servo sector position bursts 308–320, or for servo sector position bursts 308–320 associated with or located in any desired subset of tracks or zones. In this way, local variations and amplitudes may be accommodated, enabling the system of the present invention to operate with high sensitivity to high fly events, without unduly limiting the performance of the disk drive 100.

According to the present invention, a method and apparatus for detecting high fly events in a computer disk drive are provided. In particular, the present invention discloses a method and apparatus for detecting high fly events with great sensitivity, effectively protecting against data loss that may occur in connection with high fly write events, but without unduly limited the data throughput performance of the disk drive. According to the present invention, the amplitude of signals derived from servo sector position bursts is compared to a threshold amplitude. Where the observed signal strength or amplitude is less than the value set as a threshold signal strength, a high fly event is indicated. In response to the indication of the high fly event, the disk drive may prohibit subsequent write operations for a period of time.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for determining whether a flying height of a transducer head over a disk surface is within a desired range, comprising:

selecting a threshold amplitude for a signal derived from a servo sector position burst;

determining an amplitude of a signal derived from a servo sector position burst;

comparing said threshold amplitude to said determined amplitude; and signaling a write fault if a difference between said threshold amplitude and said determined amplitude is greater than a predetermined amount.

2. The method of claim 1, wherein said step of selecting a threshold amplitude comprises:

determining an amplitude of a signal derived from a servo sector position burst in each of N servo sectors;

calculating an average amplitude of said signals derived from said N servo sector position bursts; and setting said threshold amplitude equal to a value derived from said average amplitude.

3. The method of claim 1, wherein said step of selecting a threshold amplitude comprises:

determining an amplitude of a signal derived from a servo sector position burst located in each of the last N servo sectors over which said transducer head has passed;

calculating a sum of said amplitudes of signals derived from servo sector position bursts located in said last N servo sectors;

dividing said sum by N to obtain an average amplitude of said signals derived from said N servo sector position bursts; and setting said threshold amplitude equal to a value derived from said average amplitude.

4. The method of claim 3, wherein said step of selecting a threshold amplitude further comprises:

determining an amplitude of a signal derived from a next servo sector position burst;

calculating the difference between said average amplitude and said amplitude derived from said next servo sector position burst:

dividing said difference by N to obtain a quotient;

adding said quotient to said threshold amplitude to obtain a new average amplitude; and setting said threshold amplitude equal to a value derived from said new average amplitude.

5. The method of claim 3 wherein said step of setting said threshold amplitude equal to a value derived from said average amplitude comprises setting said threshold amplitude equal to said average amplitude.

6. The method of claim 1, wherein said step of selecting a threshold amplitude comprises:

determining an amplitude of a signal derived from a servo sector position burst at a desired fly height; and setting said threshold amplitude equal to a value derived from said signal amplitude corresponding to a desired fly height.

7. The method of claim 1, wherein in a disk drive having N zones, said step of selecting a threshold amplitude comprises:

determining a signal amplitude derived from a servo sector position burst located in each of said N zones; and setting a value derived from said amplitude derived from a servo sector position burst in said N zones equal to N selected threshold amplitudes, wherein a one of said N selected threshold amplitudes from a first of said N zones is compared to an amplitude of a signal derived from a servo sector position burst located in said first of said N zones in said step of comparing, and wherein a second of said N selected threshold amplitudes from a second of said N zones is compared to an amplitude of a signal derived from a servo sector position burst located in said second of said N zones in said step of comparing.

8. The method of claim 1, wherein said servo sector position burst comprises a group of servo sector position bursts.

9. The method of claim 8, wherein said group of servo sector position bursts comprises A and B servo sector position bursts.

10. The method of claim 8, wherein said group of servo sector position bursts comprises A, B, C and D servo sector position bursts.

11. The method of claim 1, wherein prior to said step of determining an amplitude of a signal derived from said servo sector position burst, an amplitude of a first signal derived from at least a first automatic gain control field is determined, and wherein said first signal derived from said automatic gain control field is used to set an initial signal gain amount in a read channel of said disk drive.

12. The method of claim 1, wherein prior to said step of determining an amplitude of a signal derived from said servo sector position burst, an amplitude of a signal derived from at least a first automatic gain control field is determined, wherein an initial gain amount in a read channel of said disk drive is established according to at least a first criterion, and wherein after said initial gain amount is set, an amplitude of a signal derived from at least a second automatic gain control field is determined, wherein a subsequent gain amount in a read channel of said disk drive is established according to at least a second criterion.

13. The method of claim 12, wherein said first criterion permits a change in said gain amount to occur at a faster rate than does said second criterion.

14. The method of claim 1, further comprising, in response to a write fault signal, prohibiting a write function of said disk drive from occurring for at least a first time period.

15. The method of claim 14, wherein said first time period corresponds to an amount of time necessary for two servo sectors to pass beneath a transducer head of said disk drive.

16. A method for detecting a high fly write condition in a disk drive, comprising:

providing a magnetic storage disk on which data is stored in concentric tracks divided into sectors and having servo sector position bursts;

providing a transducer head for reading data from said disk and writing data to said disk;

providing a data channel for transmitting signals derived from information stored on said magnetic storage disk to a host computer;

establishing a first reference signal strength;

determining a strength of a read signal derived from a group of servo sector position bursts contained in a servo sector;

producing a signal indicating that a flying height of said transducer head over said disk is within a desired range if said signal is greater than or equal to said first reference strength; and producing a signal indicating that said flying height of said transducer head over said disk is not within a desired range if said signal is less than said first reference strength.

17. The method of claim 16, further comprising prohibiting a write operation for at least a first period of time if said signal is less than said first reference strength.

18. The method of claim 16, wherein said step of establishing a first reference strength comprises:

determining a strength of a read signal derived from a group of servo sector position bursts in each of N servo sectors;

calculating an average strength of said signals derived from said N groups of servo sector position bursts; and setting said first reference strength equal to a value derived from said average strength.

19. The method of claim 16, wherein said step of establishing a first reference strength comprises:

determining a strength of a read signal derived from a group of servo sector position bursts in each of N servo sectors;

calculating an average strength of said signal derived from said N groups of servo sector position bursts;

adding a correction amount to said average strength to obtain a corrected average strength; and setting said first reference strength equal to said corrected average strength.

20. The method of claim 16, wherein said step of establishing a first reference strength comprises:

determining, for each of the last N servo sectors over which said transducer head has passed, a strength of a read signal derived from a group of servo sector position bursts located in each of said N servo sectors;

calculating a sum of said signals derived from a group of servo sector position bursts located in each of said N servo sectors;

dividing said sum by N to obtain an average strength of said signals derived from a group of servo sector position bursts located in each of said N servo sectors;

determining a strength of a next group of servo sector position bursts;

calculating a difference between said average strength and said strength of said next group of servo sector position bursts;

dividing said difference by N to obtain a quotient;

adding said quotient to said average strength to obtain a new average strength;

applying a correction factor to said new average strength to obtain a modified new average strength; and setting said modified new average strength equal to said first reference strength.

21. The method of claim 16, wherein said step of establishing a first reference strength comprises:

determining a signal strength derived from servo sector position bursts located in each of N zones;

setting said signal strength derived from servo sector position bursts in said N zones equal to N selected reference strengths, wherein a one of said N selected reference strengths from a first of said N zones is compared to a signal strength of servo sector position bursts located in said first of said N zones in said step of comparing, and wherein a second of said N selected reference strengths from a second of said N zones is compared to a strength of servo sector position bursts located in said second of said N zones in said step of comparing.

22. The method of claim 16, wherein said group of servo sector position bursts comprise A and B servo sector position bursts.

23. The method of claim 16, wherein said group of servo sector position bursts comprise A, B, C and D servo sector position bursts.

24. The method of claim 16, wherein prior to said step of determining a strength of a signal derived from said group of servo sector position bursts, a strength of a first signal derived from an automatic gain control field is determined, and wherein said first signal derived from an automatic gain control field is used to set an initial signal gain amount in a read channel of said disk drive.

25. The method of claim 16, wherein prior to said step of determining a strength of a signal derived from said group of servo sector position bursts, a strength of a signal derived from an automatic gain control field is determined, wherein an initial gain amount in a read channel of said disk drive is established according to at least a first criterion, and wherein after said initial gain amount is set, a strength of a signal derived from at least a first subsequent automatic gain control field is determined, wherein a subsequent gain amount in a read channel of said disk drive is established according to at least a second criterion.

26. The method of claim 25, wherein said first criterion permits a change in said gain amount to occur at a faster rate than does said second criterion.

27. The method of claim 16, further comprising, in response to a signal indicating that said flying height of said transducer head over said disk is not within a desired range, prohibiting a write function of said disk drive for at least a first time period.

28. The method of claim 27, wherein said first time period corresponds to an amount of time necessary for two servo sectors to pass beneath said transducer head of said disk drive.

29. A disk drive capable of determining whether a flying height of a head above a disk surface is within a desired range, comprising:

a base;

a magnetic storage disk rotatably mounted to said base, wherein data is stored on said storage disk magnetically in concentric tracks, wherein said tracks are divided into a plurality of data sectors, and wherein each of said tracks contains at least a first servo sector position burst for each of said data sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track; and a channel for transmitting a signal from said transducer head to a host computer and for transmitting a signal from said host computer to said transducer head, wherein a signal read by said transducer head and derived from said at least a first position servo burst having a strength within an acceptable range signals that said flying height of said head is within a desired range, and wherein a signal read by said transducer head and derived from a servo sector position burst having a strength within at least a first unacceptable range signals that said flying height of said head is not within a desired range.

30. A method for determining whether a flying height of a transducer head over a disk surface is within a desired range, comprising:

selecting a threshold amplitude for a signal derived from a servo sector position burst;

determining an amplitude of a signal derived from at least a first automatic gain control field, wherein an initial gain amount in a read channel of said disk drive is established according to at least a first criterion, and wherein after said initial gain amount is set, an amplitude of a signal derived from at least a second automatic gain control field is determined, wherein a subsequent gain amount in a read channel of said disk drive is established according to at least a second criterion, wherein said first criterion permits a change in said gain amount to occur at a faster rate than does said second criterion;

determining an amplitude of a signal derived from a servo sector position burst;

comparing said threshold amplitude to said determined amplitude; and signaling a write fault if a difference between said threshold amplitude and said determined amplitude is greater than a predetermined amount.

31. A method for detecting a high fly write condition in a disk drive, comprising:

providing a magnetic storage disk on which data is stored in concentric tracks divided into sectors and having servo sector position bursts;

providing a transducer head for reading data from said disk and writing data to said disk;

providing a data channel for transmitting signals derived from information stored on said magnetic storage disk to a host computer;

establishing a first reference signal strength;

determining a strength of a signal derived from an automatic gain control field, wherein an initial gain amount in a read channel of said disk drive is established according to at least a first criterion, and wherein after said initial gain amount is set, a strength of a signal derived from at least a first subsequent automatic gain control field is determined, wherein a subsequent gain amount in a read channel of said disk drive is established according to at least a second criterion, and wherein said first criterion permits a change in said gain amount to occur at a faster rate than does said second criterion;

determining a strength of a read signal derived from a group of servo sector position bursts contained in a servo sector;

producing a signal indicating that a flying height of said transducer head over said disk is within a desired range if said signal is greater than or equal to said first reference strength; and producing a signal indicating that said flying height of said transducer head over said disk is not within a desired range if said signal is less than said first reference strength.

* * * * *